Oct. 21, 1941.    J. T. ZELLERS    2,259,716
APPARATUS FOR FORMING SHEET GLASS
Filed May 21, 1938
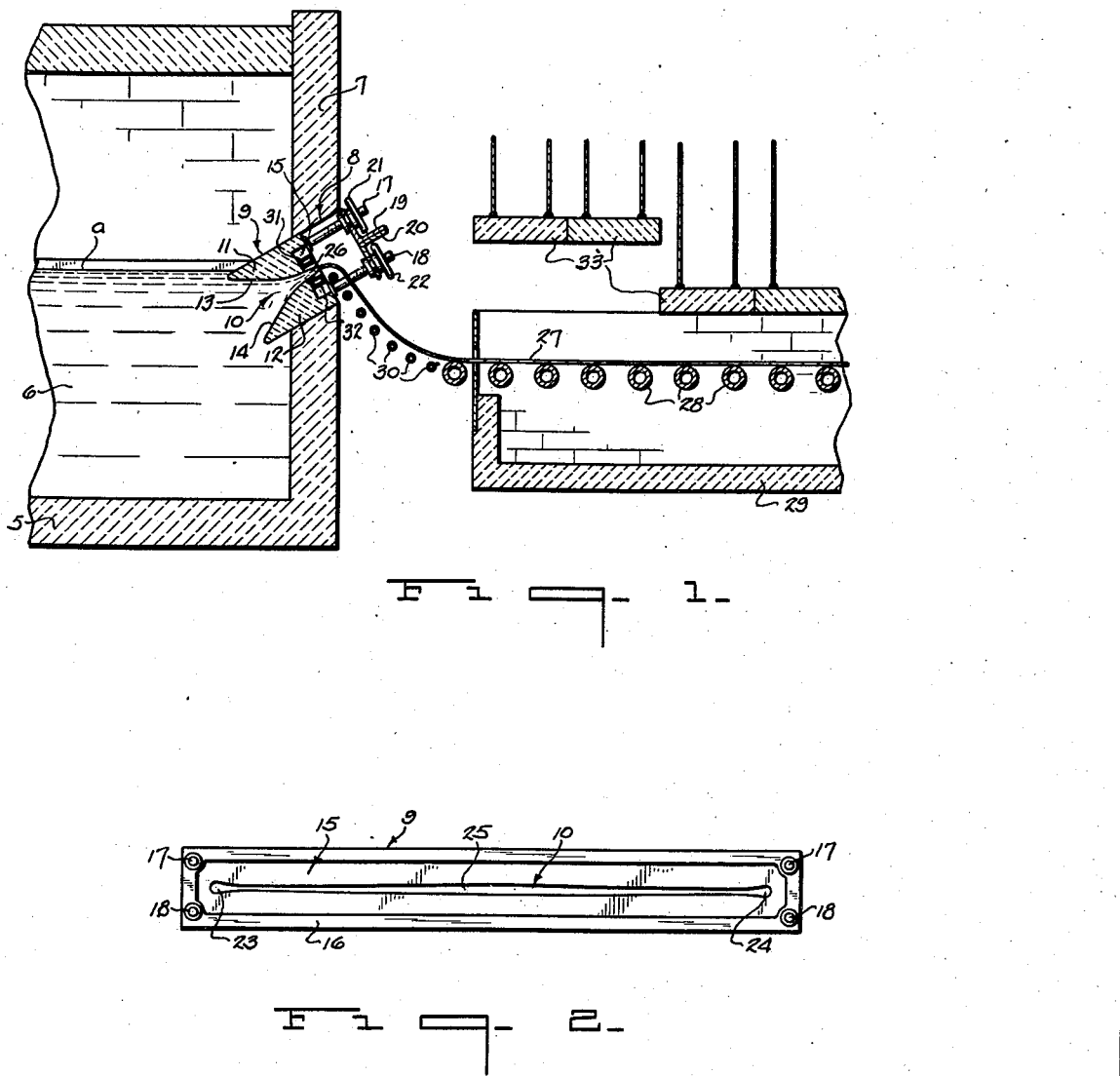
Inventor
JAMES T. ZELLERS.
By Frank Fraser
Attorney Patented Oct. 21, 1941

2,259,716

UNITED STATES PATENT OFFICE 2,259,716

APPARATUS FOR FORMING SHEET GLASS

James T. Zellers, Toledo, Ohio, assignor to Libbey-Owens-Ford Glass Company, Toledo, Ohio, a corporation of Ohio Application May 21, 1938, Serial No. 209,171

4 Claims. (Cl. 49—17)

The present invention relates broadly to the manufacture of glassware, and more particularly to improved apparatus for producing sheet glass in continuous or substantially continuous flat sheet form.

An important object of this invention is the provision of a novel apparatus for facilitating and improving generally the continuous formation of transparent sheet glass, having highly polished surfaces, directly from a body of molten glass.

Another important object of the invention is the provision of such apparatus wherein molten glass is forced continuously upwardly and outwardly under pressure through an inclined sheet forming slot in one wall of a tank, the sheet being carried away from said slot into and through a horizontal annealing leer, whereby high quality transparent glass can be produced at a relatively low cost.

A further important object of the invention is the provision of such apparatus wherein the thickness of sheet produced is not dependent upon the use of sizing members or rolls of any kind but instead is determined by the dimensions of the sheet forming slot in the tank; the temperature of the molten glass; and the speed at which the sheet is drawn away from said slot, to the end that an exceptionally flat sheet of uniform thickness may be produced.

A still further important object of the invention is the provision of such apparatus wherein the glass sheet, after leaving the sheet forming slot in the tank, is handled and treated in such a manner as to avoid marring of the surfaces thereof, whereby to insure the efficient production of a finished sheet of glass devoid of strain and having opposite surfaces of high and uniform luster and brilliancy.

Other objects and advantages of the invention will become more apparent during the course of the following description, when taken in connection with the accompanying drawing.

In the drawing, wherein like numerals are employed to designate like parts throughout the same:

Fig. 1 is a vertical longitudinal section through sheet glass forming apparatus constructed in accordance with the present invention; and Fig. 2 is a plan view of the slotted sheet forming member.

With reference to the drawing, there is illustrated a portion of a tank 5 containing a relatively deep body of molten glass 6, said tank preferably consisting of a continuous tank furnace in which the molten glass is adapted to be continuously produced and conditioned. The outer end wall 7 of the tank is provided at substantially the level a of the body of molten glass 6 with a horizontal opening 8 of the desired length and inserted through said opening is the sheet forming member 9 constructed of a suitable refractory material in order to withstand the high temperature of the molten glass and also to provide a material which has rather poor heat conducting properties.

The sheet forming member 9 consists of a substantially rectangular block having a longitudinally extending slot 10 therein which terminates inwardly of the opposite ends of said block and divides the same into a pair of similar side portions 11 and 12. The inner adjacent walls 13 and 14 of the side portions 11 and 12 curve rearwardly and laterally away from one another, so that the slot 10 gradually increases in width from the outer end of the block to the inner end thereof, as clearly shown in Fig. 1. The outer end of the block is provided with a recess 15 and completely surrounding said recess is an upstanding continuous rim 16.

The sheet forming member 9 is arranged within the opening 8 in the end wall 7 of the tank at an angle to the horizontal in a manner that the slot 10 in said member inclines upwardly and outwardly. While this angle has been shown in the drawing as being approximately thirty degrees to the horizontal, it will be readily appreciated that the said angle may be varied as desired. The sheet forming member is adapted to be forced inwardly through the opening 8 in the tank to the desired extent and rigidly secured in such position by means of supporting bolts 17 and 18 associated with each end of the block. The bolts 17 and 18 are attached at their inner ends to the rim 16 of the slotted block while the outer ends thereof pass loosely through stationary angle beams or the like 19 and 20 respectively suitably supported at their opposite ends. Associated with the outer ends of the supporting bolts 17 and 18 are nuts 21 and 22 respectively effective for threading the said bolts inwardly or outwardly through the angle beams 19 and 20 to properly position the sheet forming member 9.

The shape and size of the slot 10 in the sheet forming member can be varied as desired, but, as shown in Fig. 2, it is preferably provided with relatively large ends 23 and 24 which are adapted to permit a sufficient flow of glass along the edge portions of the sheet being formed to hold the sheet to width and thereby avoid narrowing thereof before it is set. Also, the slot 10 is preferably relatively wider at its central portion, as indicated at 25, and narrows gradually to the enlarged ends 23 and 24.

In operation, the sheet forming member 9 is forced downwardly into the body of molten glass 6 a distance sufficient to cause the glass to be forced upwardly and outwardly through the slot 10 by hydrostatic pressure. That is to say, the sheet forming member penetrates as far as required into the body of molten glass so as to cause the glass to spout continuously under pressure through the slot 10 to form a sheet source 26 which constitutes the base or meniscus of the sheet being formed. The glass is drawn away from the sheet source 26 in the form of a continuous sheet 27 which, upon leaving the sheet forming member, passes first downwardly and outwardly and then horizontally onto a series of horizontally aligned rolls 28 which carry the sheet through a horizontal annealing leer 29.

As the glass sheet 27 travels across the horizontal space between the furnace 5 and leer 29, it is entirely unsupported and does not contact with any solid bodies or mechanical means which might tend to mar the under surface of the sheet or spoil its finish. The distance between the furnace and leer is such that by the time the sheet engages the rolls 28 a surface skin has been formed on the glass so that it will not be marked by said rolls. If desired, the glass sheet can be subjected to a cooling action while unsupported to assist in the formation of a surface skin thereon and this can be accomplished by directing jets of cooling air against the bottom surface of the sheet from perforated pipes or the like 30 extending transversely thereof. Any suitable number of air pipes 30 can be used and they are preferably, though not necessarily, arranged to conform to the curvature of the sheet in its passage from the tank to the leer. The pipes 30 can, of course, also be utilized to direct heated air against the sheet, if desired.

For the purpose of controlling the temperature of the base or meniscus 26 of the sheet, suitable water coolers 31 and 32 may be arranged at opposite sides thereof. These coolers are shown as being disposed in the recess 15 of the sheet forming member. To further assist in properly controlling the temperature of the glass sheet, the top of the leer 29 may be constructed at the entrance end thereof of a plurality of vertically movable sections which may be raised and lowered to expose the sheet to the atmosphere.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for producing transparent sheet glass, the combination with a tank containing a body of molten glass and having an upwardly and outwardly inclined opening in one vertical confining wall thereof, of a sheet forming member arranged within said opening comprising a pair of similar side portions projecting into said tank and spaced to provide a longitudinally extending slot which also inclines upwardly and outwardly, the position of said slot with respect to the body of molten glass being such that the glass will be forced continuously upwardly and outwardly under hydrostatic pressure through the said slot directly from said body of molten glass to form a sheet source from which a flat sheet of predetermined dimensions may be continuously drawn.

2. In apparatus for producing transparent sheet glass, the combination with a tank containing a body of molten glass and having an upwardly and outwardly inclined opening in one vertical confining wall thereof, of a sheet forming member arranged within said opening comprising a pair of similar side portions projecting into said tank and spaced to provide a longitudinally extending slot which also inclines upwardly and outwardly, and means for mounting said sheet forming member and for adjusting it inwardly or outwardly through said opening to the desired position, the position of said slot with respect to the body of molten glass being such that the glass will be forced continuously upwardly and outwardly under hydrostatic pressure through the said slot directly from said body of molten glass to form a sheet source from which a flat sheet of predetermined dimensions, may be continuously drawn.

3. In apparatus for producing transparent sheet glass, the combination with a tank containing a body of molten glass and having an upwardly and outwardly inclined opening in one vertical confining wall thereof, of a sheet forming member arranged within said opening comprising a pair of similar side portions projecting into said tank and spaced to provide a longitudinally extending slot which also inclines upwardly and outwardly, the inner adjacent walls of said side portions curving rearwardly and laterally away from one another so that the slot gradually increases in width from the outer end of said sheet forming member to the inner end thereof, the position of said slot with respect to the body of molten glass being such that the glass will be forced continuously upwardly and outwardly under hydrostatic pressure through the said slot directly from said body of molten glass to form a sheet source from which a flat sheet of predetermined dimensions may be continuously drawn.

4. In apparatus for producing transparent sheet glass, the combination with a tank containing a body of molten glass and having an upwardly and outwardly inclined opening in one vertical confining wall thereof, of a sheet forming member arranged within said opening comprising a pair of similar side portions projecting into said tank and spaced to provide a longitudinally extending slot which also inclines upwardly and outwardly, the inner adjacent walls of said side portions curving rearwardly and laterally away from one another so that the slot gradually increases in width from the outer end of said sheet forming member to the inner end thereof, and means for mounting said sheet forming member and for adjusting it inwardly or outwardly through said opening to the desired position, the position of said slot with respect to the body of molten glass being such that the glass will be forced continuously upwardly and outwardly under hydrostatic pressure through the said slot directly from said body of molten glass to form a sheet source from which a flat sheet of predetermined dimensions may be continuously drawn.

JAMES T. ZELLERS.